US009534460B2

(12) United States Patent
Watson et al.

(10) Patent No.: US 9,534,460 B2
(45) Date of Patent: Jan. 3, 2017

(54) FLAPPER VALVE TOOL

(71) Applicant: Thru Tubing Solutions, Inc., Oklahoma City, OK (US)

(72) Inventors: Brock Watson, Oklahoma City, OK (US); Roger Schultz, Newcastle, OK (US); Andy Ferguson, Moore, OK (US)

(73) Assignee: Thru Tubing Solutions, Inc., Oklahoma City, OK (US)

( * ) Notice: Subject to any disclaimer, the term of this patent is extended or adjusted under 35 U.S.C. 154(b) by 0 days.

(21) Appl. No.: 14/615,237

(22) Filed: Feb. 5, 2015

(65) Prior Publication Data
US 2016/0047201 A1 Feb. 18, 2016

Related U.S. Application Data

(60) Provisional application No. 62/038,049, filed on Aug. 15, 2014.

(51) Int. Cl.
| *E21B 21/10* | (2006.01) |
| *E21B 34/14* | (2006.01) |
| *E21B 34/00* | (2006.01) |
| *E21B 33/128* | (2006.01) |

(52) U.S. Cl.
CPC ........... *E21B 21/10* (2013.01); *E21B 34/14* (2013.01); *E21B 33/128* (2013.01); *E21B 2034/005* (2013.01)

(58) Field of Classification Search
CPC E21B 2034/005; E21B 33/128; E21B 3/1277; E21B 34/06; E21B 3/102; E21B 3/14; E21B 34/12; E21B 21/10
See application file for complete search history.

(56) References Cited

U.S. PATENT DOCUMENTS

| 4,469,174 | A  | * | 9/1984  | Freeman ................. 166/202 |
| 4,531,587 | A  |   | 7/1985  | Fineberg |
| 4,729,432 | A  | * | 3/1988  | Helms .................... 166/317 |
| 6,679,336 | B2 |   | 1/2004  | Musselwhite et al. |
| 6,712,145 | B2 | * | 3/2004  | Allamon ................. 166/327 |
| 6,712,150 | B1 | * | 3/2004  | Misselbrook et al. .... 166/384 |
| 2002/0148615 | A1 | * | 10/2002 | Szarka et al. ......... 166/332.4 |
| 2006/0207764 | A1 | * | 9/2006  | Rytlewski ............... 166/313 |
| 2011/0030968 | A1 | * | 2/2011  | Xu ......................... 166/373 |
| 2014/0202713 | A1 |   | 7/2014  | Stewart et al. |

FOREIGN PATENT DOCUMENTS

WO 2012/048144 4/2012

OTHER PUBLICATIONS

PCT/US2015/014972; International Search Report and Written Opinion; dated May 14, 2015; 16 pages.

* cited by examiner

*Primary Examiner* — Shane Bomar
*Assistant Examiner* — Christopher Sebesta
(74) *Attorney, Agent, or Firm* — Hall Estill Law Firm

(57) ABSTRACT

The present invention is related to a downhole tool having a flapper valve assembly for controlling the backflow of fluid into a tubing string. The downhole tool includes a first sleeve slidably disposable within at least a portion of the flapper valve assembly and the downhole tool. The downhole tool can also include a second sleeve slidably disposed within the downhole tool. The present invention is also related to a method of using the downhole tool. The method includes the step of positioning the downhole tool in a wellbore. Once the downhole tool is positioned in the wellbore, the first sleeve is shifted to interact with the flapper valve assembly.

25 Claims, 5 Drawing Sheets

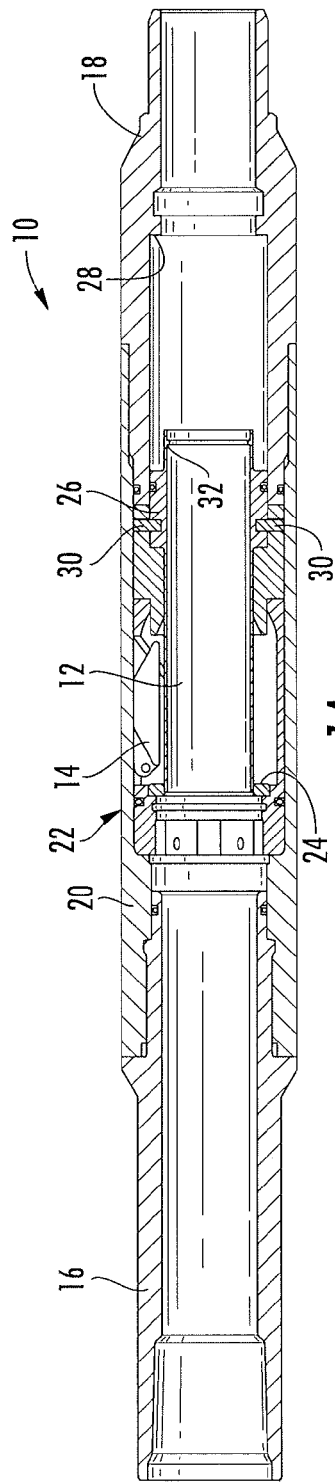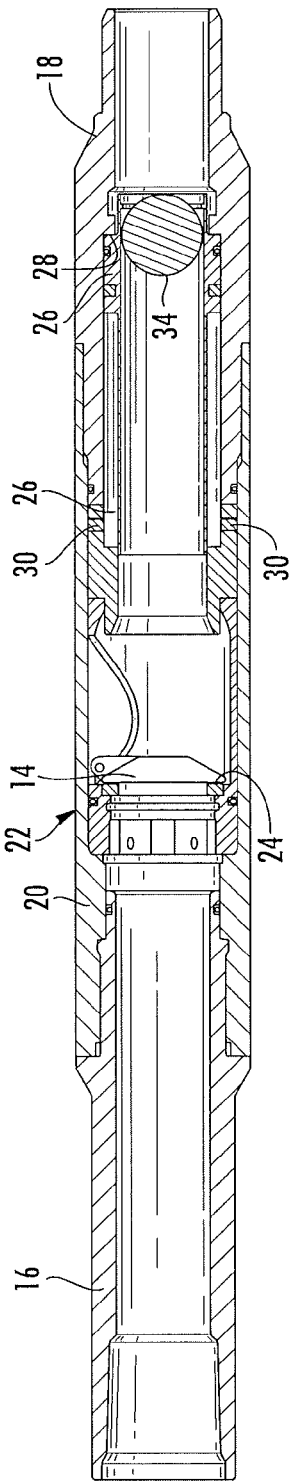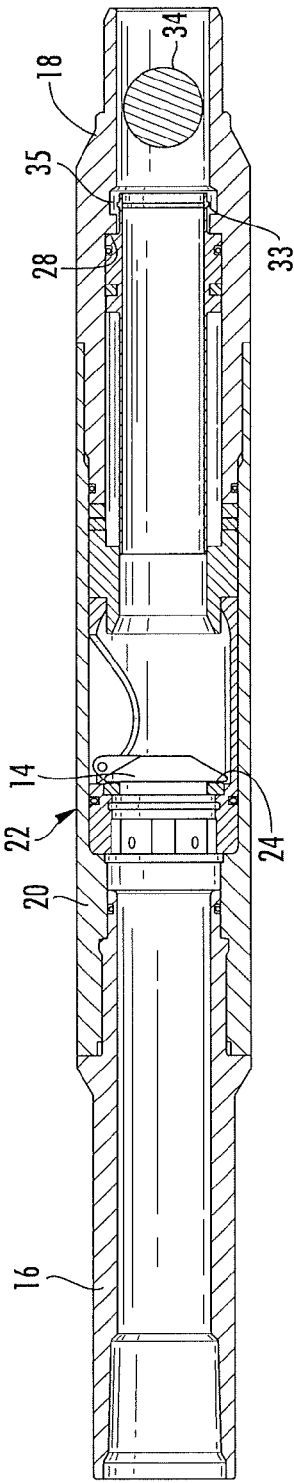

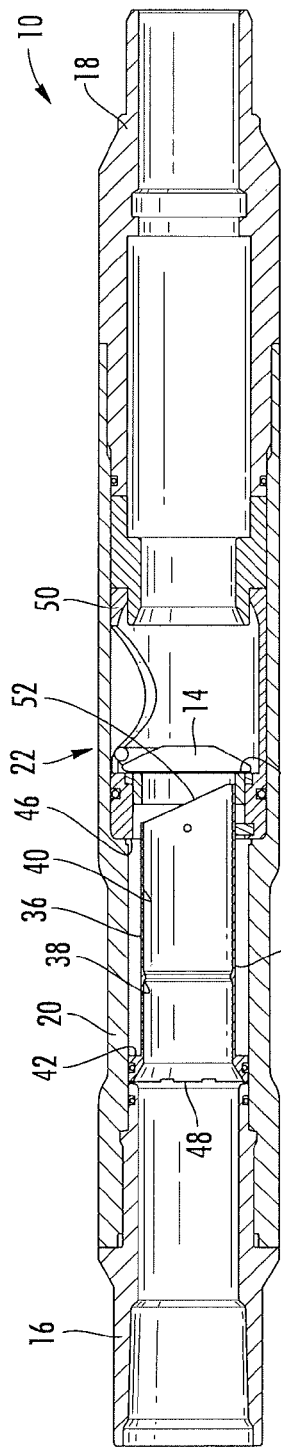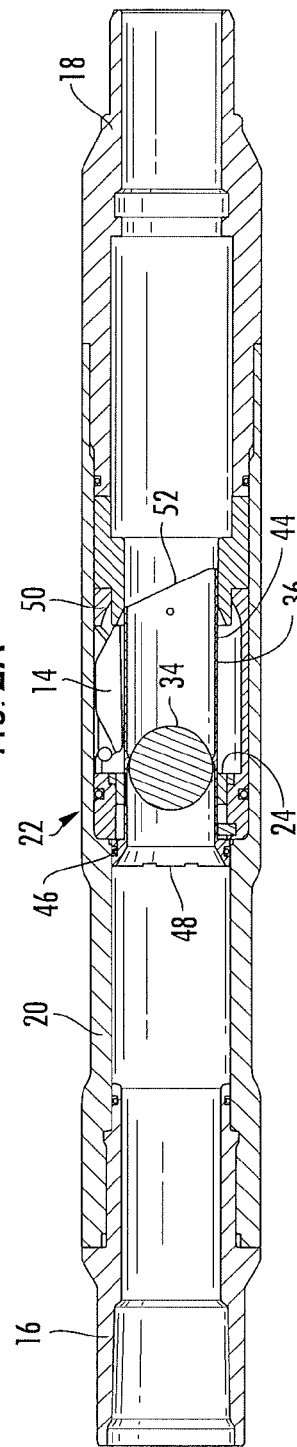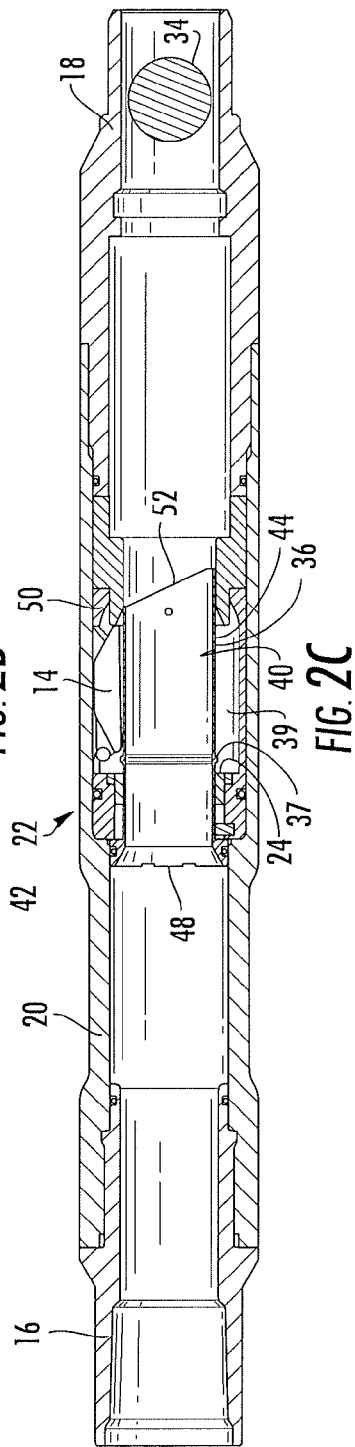

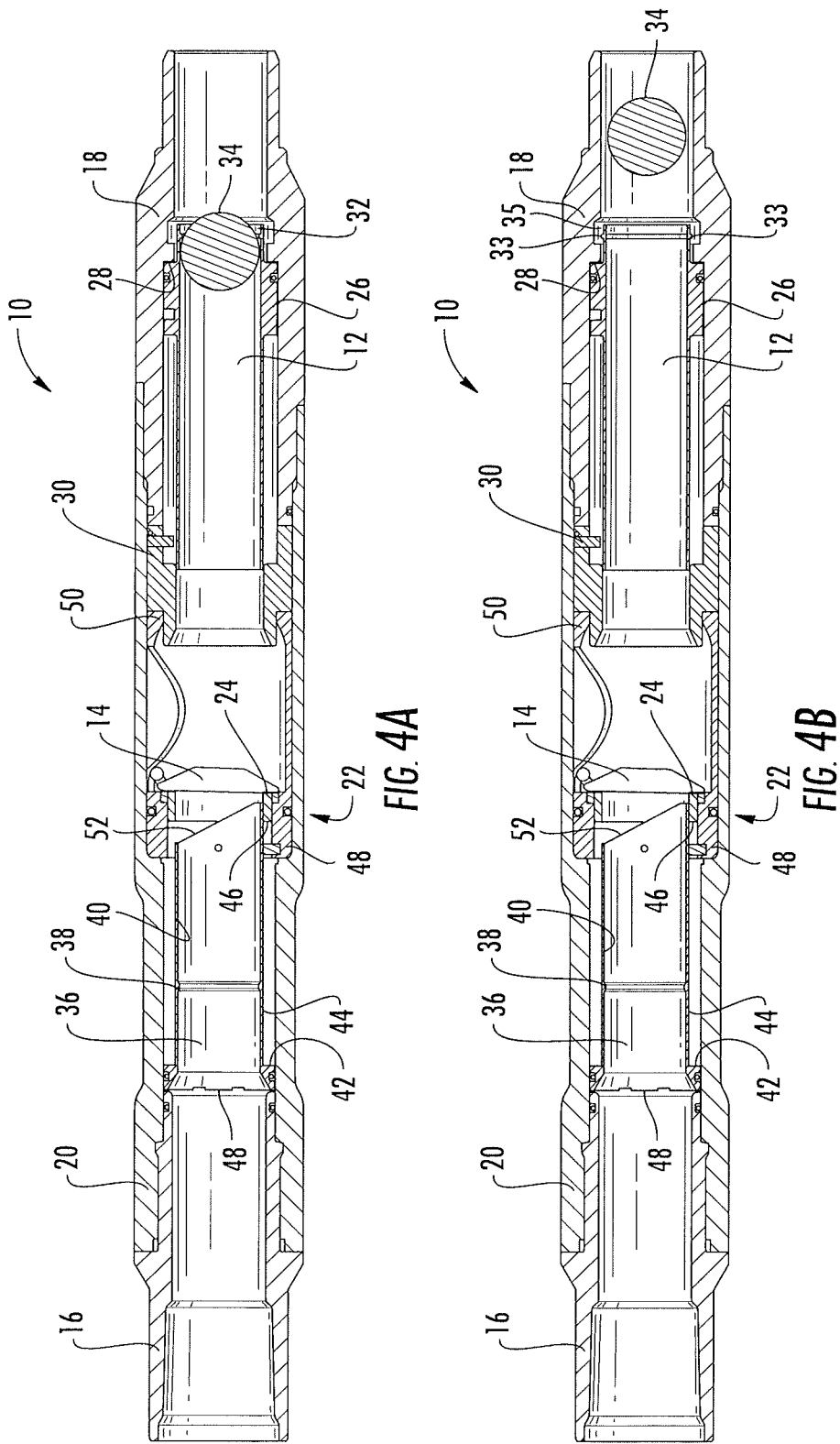

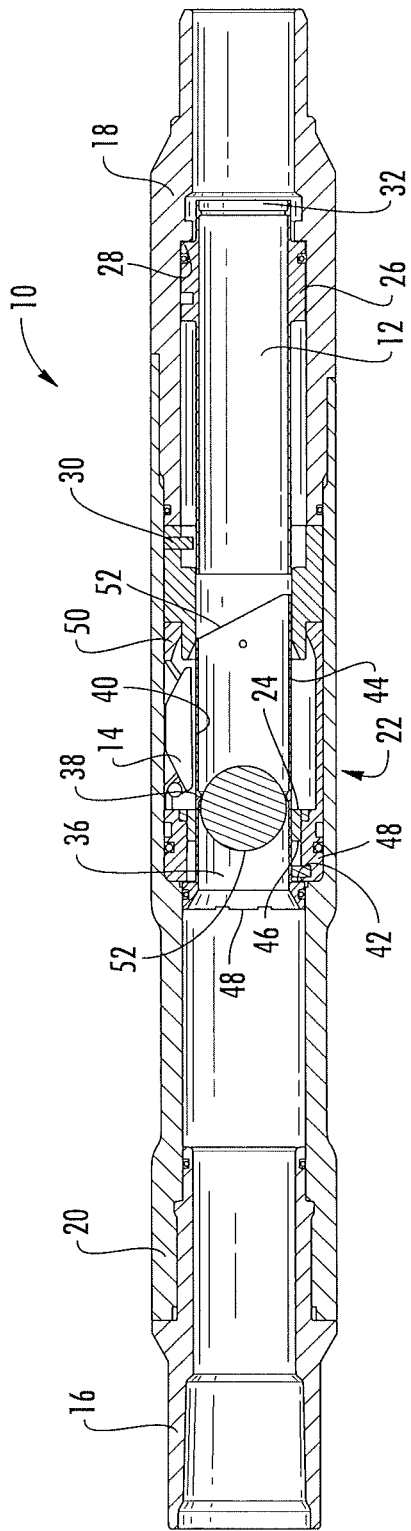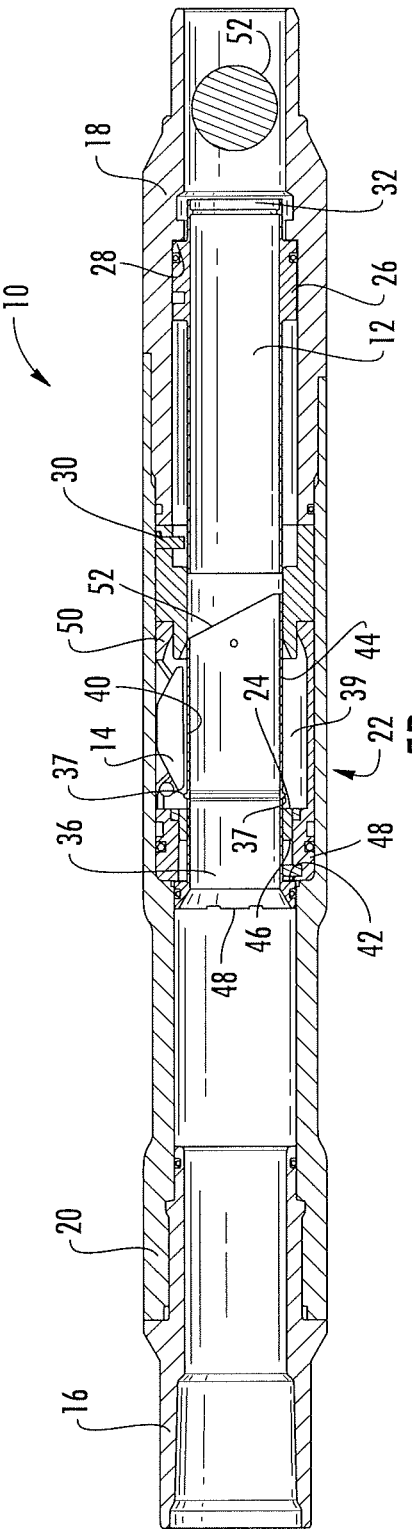

FLAPPER VALVE TOOL

CROSS-REFERENCE TO RELATED APPLICATIONS

The present application is a conversion of U.S. Provisional Application having U.S. Ser. No. 62/038,049, filed Aug. 15, 2014, which claims the benefit under 35 U.S.C. 119(e), the disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a downhole tool used to control and/or prevent pressurized wellbore fluids from traveling up through the workstring tubing.

2. Description of the Related Art

Traditionally, flapper valves have been used to prevent pressurized wellbore fluids from entering a workstring from the bottom up. Typical flapper valves can wear out after a period of use.

Accordingly, there is a need for a way to be able to reliably maintain a flapper valve in an open position.

SUMMARY OF THE DISCLOSURE

The disclosure is related to a downhole tool having a flapper valve assembly for controlling the backflow of fluid into a tubing string. The downhole tool also includes a first sleeve slidably disposable within at least a portion of the flapper valve assembly and the downhole tool. The downhole tool can also include a second sleeve slidably disposed within the downhole tool.

The disclosure is also related to a method of using the downhole tool. The method includes the step of positioning the downhole tool in a wellbore. Once the downhole tool is positioned in the wellbore, the first sleeve is shifted to interact with the flapper valve assembly.

BRIEF DESCRIPTION OF THE DRAWINGS

FIGS. 1A-1C are cross-sectional views of one embodiment of a downhole tool constructed in accordance with the present invention.

FIGS. 2A-2C are cross-sectional views of another embodiment of the downhole tool constructed in accordance with the present invention.

FIGS. 4A and 4B are cross-sectional views of the embodiment of the downhole tool shown in FIG. 3 in a second position and constructed in accordance with the present disclosure.

FIGS. 5A and 5B are cross-sectional views of the embodiment of the downhole tool shown in FIG. 3 in a third position and constructed in accordance with the present disclosure.

DETAILED DESCRIPTION OF THE DISCLOSURE

Figure 3:
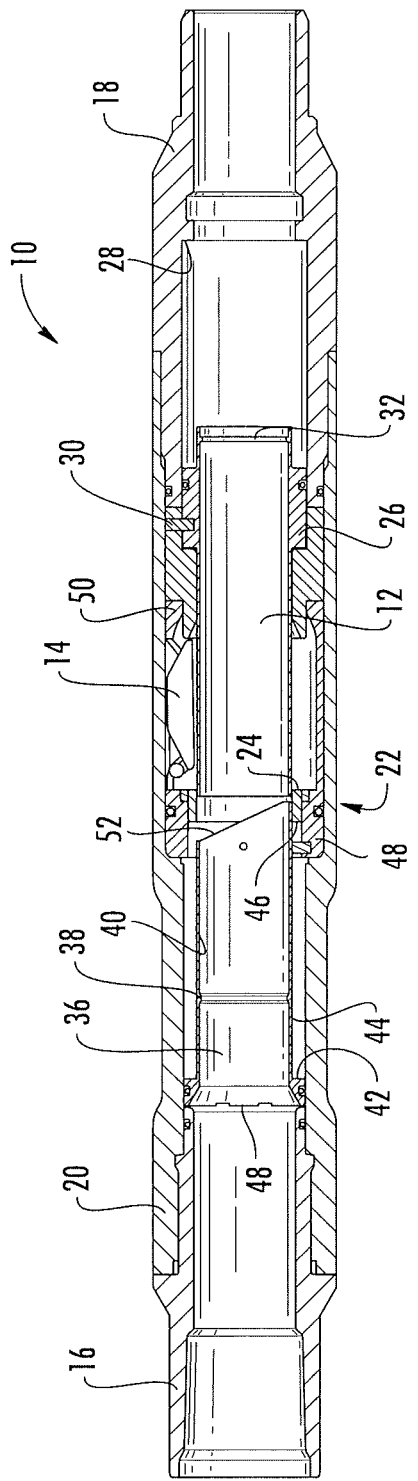
FIG. 3 is a cross-sectional view of yet another embodiment of the downhole tool constructed in accordance with the present disclosure.

The present disclosure relates to a flapper valve tool 10 that can be designed and implemented into a bottom hole assembly (BHA) that has at least one sleeve disposed therein to either open a flapper 14 or permit the flapper 14 to close.

In one embodiment of the present disclosure shown in FIGS. 1A-1C, the flapper valve tool 10 includes a top sub 16 for connecting to other tools disposed above the flapper valve tool 10 in the BHA, a bottom sub 18 for connecting the flapper valve tool 10 to other tools disposed below the flapper valve tool 10 in the BHA and a housing 20 (or body) connecting the top sub 16 to the bottom sub 18. In this embodiment, the flapper valve tool 10 includes a closing sleeve 12 slidably disposed in the housing 20 and a flapper assembly 22 disposed in the housing 20.

The flapper assembly 22 includes a flapper 14 for selectively blocking the backflow of fluid through the flapper valve tool 10 and a flapper seat 24 disposed in the housing 20 such that the closing sleeve 12 can slide through the flapper seat 24. The flapper 14 sits against the flapper seat 24 when the flapper 14 is in the closed position and prevents pressurized fluid from flowing in the uphole direction through the flapper valve tool 10. The flapper 14 can be hingedly connected to the flapper seat 24 or to the inside of the housing 20.

The closing sleeve 12 shown in FIGS. 1A-1C includes a collar 26 disposed around an outside portion of the closing sleeve 12 and the flapper valve tool 10 includes a shoulder 28 disposed therein to engage the collar 26 and prevent further sliding movement of the closing sleeve 12 when the closing sleeve 12 is shifted from a first position in the flapper valve tool 10 to a second position in the flapper valve tool 10. The shoulder 28 can be disposed on the inside of the bottom sub 18 or the housing 20 of the flapper valve tool 10. The closing sleeve 12 can be held in the first position in the flapper valve tool 10 via any means known in the art, such as shear pins 30. The closing sleeve 12 can also include a lip 32 disposed around a portion of the inside of the closing sleeve 12 to create a seat for a fluid blocking member 34 to engage and not be able to pass completely through the closing sleeve 12.

FIG. 1A shows the closing sleeve 12 in its first position and holding the flapper 14 in an open position. FIG. 1B shows the fluid blocking member 34 engaged with the lip 32 of the closing sleeve 12 and the closing sleeve 12 in its second position in the flapper valve tool 10. When enough pressure is put behind the fluid blocking member 34, the shear pins 30 fail and permit the closing sleeve 12 to move from its first position to its second position in the flapper valve tool 10. The closing sleeve 12 will travel a predetermine distance before the collar 26 of the closing sleeve 12 impacts the shoulder 28 disposed on the inside of the flapper valve tool 10, which prevents further movement of the closing sleeve 12 in the flapper valve tool 10. After the closing sleeve 12 travels a specific amount, the flapper 14 is no longer prevented from closing and the flapper 14 closes against the flapper seat 24 to prevent fluid from flowing in the uphole direction through the flapper valve tool 10. If desired, high pressure fluid can be pumped down to force the fluid blocking member 34 past the lip 32 in the closing sleeve 12, as can be seen in FIG. 1C. As the fluid blocking member 34 is forced past the lip 32, a deformed portion 33 is created in the closing sleeve 12 due to the force and pressure required to force the fluid blocking member 34 past the lip 32 in the closing sleeve 12. The deformed portion 33 of the closing sleeve 12 extends into a depression area 35 disposed on the inner portion of the housing 20 or bottom sub 18 and prevents the closing sleeve 12 from traveling in the uphole direction in the flapper valve tool 10.

In another embodiment of the present disclosure shown in FIGS. 2A-2C, the flapper valve tool 10 includes an opening sleeve 36 (as opposed to the closing sleeve 12) that has a first position where the flapper 14 is set against the flapper seat 24 (closed). Consequently, the flapper 14 is in the open position when the opening sleeve 36 is in its second position. The opening sleeve 36 has a lip 38 disposed around an inner portion 40 of the opening sleeve 36 and a collar 42 disposed around an outer portion 44 of the opening sleeve 36. The lip 38 is designed to provide a seat for engaging with the fluid blocking member 34. The collar 42 is designed to engage with a shoulder 46 disposed within the flapper valve tool 10. In one embodiment, the collar 42 is disposed on an uphole end 48 of the opening sleeve 36 to engage the shoulder 46, which can be disposed on an inner portion of the housing 20 or a part of a flapper body 50 of the flapper assembly 22. Similar to the closing sleeve 12, the opening sleeve 36 can be held in place via shear pins 30.

FIG. 2A shows the opening sleeve 36 in its first position wherein the flapper 14 is in the shut position and set against the flapper seat 24 restricting fluid from flowing in the uphole direction through the flapper valve tool 10. FIG. 2B shows the fluid blocking member 34 engaged with the lip 38 of the opening sleeve 36 and the opening sleeve 36 in its second position in the flapper valve tool 10. When enough pressure is put behind the fluid blocking member 34, the shear pins 30 fail and permit the opening sleeve 36 to move from its first position to its second position in the flapper valve tool 10. The flapper valve tool 10 will travel a predetermined distance before the collar 42 of the opening sleeve 36 impacts the shoulder 46 disposed on the inside of the flapper valve tool 10, which prevents further movement of the opening sleeve 36 in the flapper valve tool 10.

After the flapper valve tool 10 travels a specific amount, a downhole end 52 of the opening sleeve 36 contacts the flapper 14 and forces the flapper 14 into the open position as the opening sleeve 36 moves into its second position. This allows fluid to now flow in the uphole direction through the flapper valve tool 10. If desired, high pressure fluid can be pumped down to force the fluid blocking member 34 past the lip 38 in the opening sleeve 36 as can be seen in FIG. 2C. As the fluid blocking member 34 is forced past the lip 38, a deformed portion 37 is created in the opening sleeve 36 due to the force and pressure required to force the fluid blocking member 34 past the lip 38 in the opening sleeve 36. The deformed portion 37 of the opening sleeve 36 extends into a depression area 39 disposed on the inner portion of the housing 20 and adjacent to the flapper seat 24. The deformed portion 37 being wider than the flapper valve seat 24 prevents the opening sleeve 36 from traveling in the uphole direction in the flapper valve tool 10.

The fluid blocking member 34 can be pumped out of the flapper valve tool 10 and into some type of collection area so that fluid is permitted to flow in the uphole direction in the flapper valve tool 10. In a further embodiment, the downhole end 52 of the opening sleeve 36 can be angled such that opening the flapper 14 is significantly easier. The angle in the downhole end 52 of the opening sleeve 36 is designed such that the longer portion of the opening sleeve 36 contacts the flapper 14 on the opposite side of the flapper 14 from where the flapper 14 is hinged.

In yet another embodiment of the present disclosure shown in FIGS. 3-5B, the flapper valve tool 10 can be designed such that it has a first position where the flapper 14 is in an open position (see FIG. 3), a second position where the flapper 14 is in a closed position (see FIGS. 4A and 4B) and a third position where the flapper 14 is back in the open position (see FIGS. 5A and 5B). The flapper valve tool 10 includes the top sub 16, the bottom sub 18 and the housing 20, as previously described herein. The flapper valve tool 10 also includes the flapper assembly 22, the closing sleeve 12, and the opening sleeve 36, as described herein. The closing sleeve 12 is positioned downhole of the opening sleeve 36 in the flapper valve tool 10. Furthermore, the flapper assembly 22 can include the flapper 14, the flapper seat 24 and the flapper body 50, as previously described herein.

In use, the fluid blocking member 34 is pumped into the flapper valve tool 10 to contact the lip 32 in the closing sleeve 12. Fluid is pressured up behind the fluid blocking member 34 to shear pins 30 holding the closing sleeve 12 in the first position, which holds the flapper 14 in the open position. Once the shear pins 30 are sheared, the closing sleeve 12 is forced in the downhole direction inside the flapper valve tool 10 and into a second position for the closing sleeve 12, as shown in FIGS. 4A and 4B. After the closing sleeve 12 travels a predetermined length inside the flapper valve tool 10, the flapper 14 will spring shut against the flapper seat 24. Once the closing sleeve 12 is in the second position, fluid in the system can be further pressured up and the fluid blocking member 34 can be forced past the lip 32 disposed in the closing sleeve 12 and out of the flapper valve tool 10. FIG. 4B shows the closing sleeve 12 in the second position after the fluid blocking member 34 is pushed out of the closing sleeve 12 of the flapper valve tool 10 and the opening sleeve 36 in its first position. As disclosed herein in previous embodiments, as the fluid blocking member 34 is forced past the lip 32, a deformed portion 33 is created in the closing sleeve 12 due to the force and pressure required to force the fluid blocking member 34 past the lip 32 in the closing sleeve 12. The deformed portion 33 of the closing sleeve 12 extends into a depression area 35 disposed on the inner portion of the housing 20 or bottom sub 18 and prevents the closing sleeve 12 from traveling in the uphole direction in the flapper valve tool 10. It should be understood and appreciated that the fluid blocking member 34 is sized such that it can pass by the lip 38 in the opening sleeve 36 and then engage the lip 32 in the closing sleeve 12.

When it is desirous to have the flapper 14 back in the open position, a second fluid blocking member 54 can be pumped down into the flapper valve tool 10. The second fluid blocking member 54 is pumped down and contacts the lip 38 in the opening sleeve 36. The fluid in the flapper valve tool 10 is pressured up and shear pins 30 holding the opening sleeve 36 in the opening sleeve's 36 first position are sheared, allowing the opening sleeve 36 to move in the downhole direction in the flapper valve tool 10. As the opening sleeve 36 moves in the downhole direction, the opening sleeve 36 contacts the flapper 14 and forces it open. When the opening sleeve 36 reaches its second position in the flapper valve tool 10, the opening sleeve 36 prevents the flapper 14 from closing and maintains the flapper 14 in the open position, which is shown in FIG. 5.

Once the opening sleeve 36 is in its second position, fluid in the system can be further pressured up and the second fluid blocking member 54 can be forced past the lip 38 disposed on the opening sleeve 36 and out of the flapper valve tool 10. FIG. 5B shows the closing sleeve 12 in its second position and the opening sleeve 36 in its second position after the second fluid blocking member 54 was pushed out of the flapper valve tool 10. Similar to what was previously described herein for other embodiments, as the fluid blocking member 54 is forced past the lip 38, a deformed portion 37 is created in the opening sleeve 36 due to the force and pressure required to force the fluid blocking member 54 past the lip 38 in the opening sleeve 36. The deformed portion 37 of the opening sleeve 36 extends into a depression area 39 disposed on the inner portion of the housing 20 and adjacent to the flapper seat 24. The deformed portion 37 being wider than the flapper valve seat 24 prevents the opening sleeve 36 from traveling in the uphole direction in the flapper valve tool 10.

The present disclosure is also directed toward a method of controlling the flapper valve tool 10 and the backflow of fluid from the BHA into any tubing or tubing string the BHA is attached to. The method can include placing the flapper valve tool 10 into a wellbore, activating the closing sleeve 12 or the opening sleeve 36 to close or open the flapper 14, respectively. Activation of the closing sleeve 12 or the opening sleeve 36 can be accomplished by pumping the fluid blocking members 34, 54 into the flapper valve tool 10 to engage the lips 32, 38 of the sleeves 12, 36.

In another embodiment of the present disclosure, the flapper valve tool 10 is placed in the wellbore and the closing sleeve 12 is shifted from its first position to its second position, which causes the flapper 14 to transition from an open position to a closed position. The opening sleeve 36 can then be shifted from its first position to its second position, which causes the flapper 14 to transition from the closed position back to the open position.

From the above description, it is clear that the present disclosure is well adapted to carry out the objectives and to attain the advantages mentioned herein as well as those inherent in the disclosure. While presently disclosed embodiments have been described for purposes of this disclosure, it will be understood that numerous changes may be made which will readily suggest themselves to those skilled in the art and which are accomplished within the spirit of the disclosure.

What is claimed is:

1. A downhole tool, the tool comprising:
    a flapper valve assembly for controlling the backflow of fluid into a tubing string;
    a first sleeve slidably disposable within at least a portion of the flapper valve assembly and the downhole tool, the first sleeve slidable from a first position to a second position;
    a second sleeve slidably disposable within at least a portion of the flapper assembly and the downhole tool, the second sleeve disposed uphole of the first sleeve in the downhole tool, the second sleeve slidable from a first position to a second position; and
    a deformable portion incorporated into the first sleeve that is yieldably deformed to maintain the first sleeve in substantially the second position.

2. The tool of claim 1 wherein the flapper valve assembly comprises a flapper seat and a flapper that can close against the flapper seat and prevent fluid from passing in the uphole direction through the downhole tool.

3. The tool of claim 2 wherein the first sleeve is positioned within the downhole tool such that the flapper is in an open position when the first sleeve is in a first position.

4. The tool of claim 3 wherein the flapper is in a closed position when the first sleeve is in its second position in the downhole tool.

5. The tool of claim 4 wherein the first sleeve has a seat disposed therein to engage with a fluid blocking member to shift the first sleeve from its first position to its second position.

6. The tool of claim 2 wherein the first sleeve is positioned within the downhole tool such that the flapper is in a closed position when the first sleeve is in a first position.

7. The tool of claim 6 wherein the flapper is in an open position when the first sleeve is in its second position in the downhole tool.

8. The tool of claim 7 wherein the first sleeve has a seat disposed therein to engage with a fluid blocking member to shift the first sleeve from its first position to its second position.

9. The tool of claim 1 wherein the flapper valve assembly comprises a flapper seat and a flapper that can close against the flapper seat and prevent fluid from passing in the uphole direction through the downhole tool.

10. The tool of claim 9 wherein the flapper is in an open position when the first sleeve and the second sleeve are in their respective first positions.

11. The tool of claim 10 wherein the flapper is in a closed position when the first sleeve is in its second position and the second sleeve is in its first position.

12. The tool of claim 11 wherein the flapper is in an open position when the first sleeve is in its second position and the second sleeve is in its second position.

13. The tool of claim 12 wherein the first sleeve has a seat disposed therein to engage with a fluid blocking member to shift the first sleeve from its first position to its second position and the second sleeve has a seat disposed therein to engage with a second fluid blocking member to shift the second sleeve from its first position to its second position.

14. The tool of claim 1 wherein the second sleeve has an angled end on a downhole end of the second sleeve.

15. The tool of claim 1 further comprising a second deformable portion that is deformed to maintain the second sleeve in the second position.

16. The tool of claim 15 wherein the second deformable portion is a lip disposed in the second sleeve and once the second deformable portion is deformed a second deformed portion is created and extends into a second depression area that is disposed on an inner portion of the housing of the downhole tool, the second deformed portion on the second sleeve created from forcing a second fluid blocking member past the lip disposed in the second sleeve.

17. The tool of claim 1 wherein the deformable portion is a lip disposed in the first sleeve and once the deformable portion is deformed a deformed portion is created and extends into a depression area that is disposed on an inner portion of a housing or bottom sub of the downhole tool, the deformed portion created from forcing a fluid blocking member past the lip disposed in the first sleeve.

18. A method, the method comprising:
    positioning a downhole tool in a wellbore, the downhole tool comprising:
        a flapper valve assembly for controlling the backflow of fluid into a tubing string;
        a first sleeve slidably disposable within at least a portion of the flapper valve assembly and the downhole tool, the first sleeve slidable from a first position to a second position;
        a second sleeve slidably disposable within at least a portion of the flapper assembly and the downhole tool, the second sleeve disposed uphole of the first sleeve in the downhole tool, the second sleeve slidable from a first position to a second position; and
        a deformable portion incorporated into the first sleeve that is yieldably deformed to maintain the first sleeve in substantially the second position; and
    shifting the first sleeve in the downhole tool to interact with the flapper valve assembly.

19. The method of claim 18 wherein the flapper valve assembly comprises a flapper seat and a flapper that can close against the flapper seat and prevent fluid from passing in the uphole direction through the downhole tool.

20. The method of claim 19 further comprising the step of shifting the second sleeve in the downhole tool to interact with the flapper valve assembly.

21. The method of claim 20 wherein the flapper is in a closed position when the first sleeve is in its second position and the second sleeve is in its first position.

22. The method of claim 21 wherein the flapper is in a closed position before the second sleeve is shifted and the flapper is in an open position after the second sleeve is shifted.

23. The method of claim 18 wherein the downhole tool further comprises a second deformable portion that is deformed to maintain the second sleeve in the second position.

24. The tool of claim 23 wherein the second deformable portion is a lip disposed in the second sleeve and once the second deformable portion is deformed a second deformed portion is created and extends into a second depression area that is disposed on an inner portion of the housing of the downhole tool, the second deformed portion on the second sleeve created from forcing a second fluid blocking member past the lip disposed in the second sleeve.

25. The method of claim 18 wherein the deformable portion is a lip disposed in the first sleeve and once the deformable portion is deformed a deformed portion is created and extends into a depression area that is disposed on an inner portion of a housing or bottom sub of the downhole tool, the deformed portion created from forcing a fluid blocking member past the lip disposed in the first sleeve.

* * * * *